United States Patent [19]

Sahba et al.

[11] Patent Number: 4,744,572
[45] Date of Patent: May 17, 1988

[54] ALL-METAL, VALVE SEALING MECHANISM

[75] Inventors: Bahman Sahba, Warwick; Harry C. Champlin, Jr., Hopkinton, both of R.I.; John M. Cory, Old Lyme, Conn.

[73] Assignee: Posi-Seal International, Inc., North Stonington, Conn.

[21] Appl. No.: 73,401

[22] Filed: Jul. 14, 1987

Related U.S. Application Data

[63] Continuation of Ser. No. 706,114, Feb. 27, 1985, abandoned, which is a continuation-in-part of Ser. No. 611,741, May 18, 1984, abandoned, which is a continuation-in-part of Ser. No. 513,353, Jul. 13, 1983, abandoned.

[51] Int. Cl.⁴ .................. F16J 15/08; F16K 1/226
[52] U.S. Cl. .................. 277/236; 277/34.3; 277/226; 251/174; 251/176; 251/306
[58] Field of Search ............ 277/236, 34, 34.3, 34.6, 277/226, 12, 138, 151; 251/172-176, 306, 362

[56] References Cited

U.S. PATENT DOCUMENTS

| | | |
|---|---|---|
| 1,043,065 | 11/1912 | Cash . |
| 2,705,016 | 3/1955 | Saar .................. 277/34 X |
| 3,007,600 | 11/1961 | Horner .................. 277/236 X |
| 3,207,524 | 9/1965 | Trbovich .................. 277/236 X |
| 3,394,915 | 7/1968 | Jachot .................. 251/174 |
| 3,563,510 | 2/1971 | Priese .................. 251/173 |
| 3,575,431 | 4/1971 | Bryant .................. 277/171 |
| 3,642,248 | 2/1972 | Benware .................. 251/176 X |
| 3,747,963 | 7/1973 | Shivak .................. 277/236 X |
| 4,113,268 | 9/1978 | Simmons et al. .................. 251/306 X |
| 4,241,895 | 12/1980 | Sternenberg et al. .................. 251/173 |
| 4,277,047 | 7/1981 | Zinnai .................. 277/236 X |

FOREIGN PATENT DOCUMENTS

| | | |
|---|---|---|
| 969210 | 6/1975 | Canada .................. 277/236 |
| 2038905 | 2/1971 | Fed. Rep. of Germany . |
| 2916984 | 11/1979 | Fed. Rep. of Germany . |
| 1317235 | 1/1963 | France .................. 277/34.3 |
| 2015867 | 4/1970 | France . |
| 55-139555 | 10/1980 | Japan .................. 277/236 |
| 712786 | 7/1954 | United Kingdom .................. 277/236 |
| 781653 | 8/1957 | United Kingdom .................. 277/34.3 |

Primary Examiner—Robert S. Ward
Attorney, Agent, or Firm—Morgan & Finnegan

[57] ABSTRACT

A sealing mechanism capable of use in a valve subject to extended temperatures and pressures. The sealing mechanism comprises a seal ring positioned within a groove circumferential with respect to the passageway of the valve. A convex seating portion of the seal ring extends through an annular opening in the groove, for sealing engagement with a closure member. Shoulder portions, which extend from the sides of the seating portion, abut the sidewalls of the groove. The seal ring is compressed in width within the groove, so that a resilient side-sealing force is imparted to the contact of the shoulder portions with the sidewalls of the groove. Substantially leak proof sealing is achieved, which is maintained even in the event of high temperature conditions or fire.

27 Claims, 6 Drawing Sheets

ALL-METAL, VALVE SEALING MECHANISM

This is a continuation of co-pending application Ser. No. 706,114, filed on Feb. 27, 1985 and now abandoned, which is a continuation in-part of Ser. No. 611,741, filed May 18, 1984 and abandoned, which is a continuation in-part of Ser. No. 513,353, filed July 13, 1983 and abandoned.

BACKGROUND OF THE INVENTION

The present invention relates generally to sealing mechanisms, and more particularly to seal rings having application to valves.

The present invention is an improvement over prior art high-performance sealing mechanisms which have attempted to provide leak proof sealing and which continue to function even in the event of and following high temperature situations or fire. The need for such sealing mechanisms is particularly acute in the petroleum industry, where petroleum drilling and processing are subject, on occasion, to very high temperatures or even combustion of the material handled.

A prior art invention of Simmons et al, U.S. Pat. No. 4,113,268, provides a fire proof, bubble-tight sealing mechanism which utilizes a two stage arrangement. A soft primary seal, for example of Teflon, is inserted in the rib of a metal seal ring for contact with the complementary surface of a closure member. The Teflon material, extending radially inward beyond the metal rib, provides a bubble-tight seal under normal conditions. In the event of fire, the Teflon is destroyed. Subsequently, the metal rib of the seal ring dynamically moves into position to form a secondary or metal to metal seal.

While the Simmons et al invention was a major advance in the art, which provided an unprecedented quality of sealing and fire safety in a butterfly valve, certain drawbacks nevertheless exist. The primary seal necessitates the machining of the metal and the insertion of a soft material into the metal rib of the seal ring, the insertion thereof which is a relatively difficult and expensive manufacturing procedure.

Benware, in U.S. Pat. No. 3,642,248, discloses a valve sealing mechanism which discloses the type of dynamic sealing utilized in a preferred embodiment of the present invention. In Benware, the seal ring is fitted within a circumferential groove of a body member. A portion of the seal ring extends out of the groove, radially inward, for mating engagement with a closure member or disk. The seal ring is arranged within the groove for moveable adjustment in response to the pressure of the system.

The seal ring of Benware, in a preferred embodiment, has a backing ring which is held within the groove, beneath the seal ring. This backing ring provides a preloaded sealing force for the side-sealing of the seal ring with the walls of the groove.

The seal ring of Benware is preferably constructed of a soft material such as Teflon. However, a second embodiment discloses a metal seal ring. In the latter, a pair of inclined surfaces at the sides of the seal ring abut the lateral sides of the groove and are preloaded by being of a slightly greater dimension than the width of the groove. The front of the seal ring is curved slightly and concavely in relation to the disk surface. This causes the upstream and downstream edges of the seating surface of the seal ring to bite against the disk surface when the seal ring is pushed against the disk.

This metal seal ring of Benware has proved unsatisfactory. Although the seal ring is constructed of metal for fire safe performance, the metal to metal contact does not provide the desired quality and reliability of sealing for the desired use of such valves.

SUMMARY OF THE INVENTION

The present invention has important advantages over the prior art. It provides essentially leak proof sealing in a fire proof metal to metal seal. The seal ring may be manufactured conveniently and inexpensively. Due to its metal construction, it may be formed rather than machined and does not require the insertion of a soft plastic part. The metal seal ring design results in high-strength, resilient characteristics which provide for superior sealing and durability.

It is an object of the present invention to provide an improved seal ring which has a high quality of sealing in an extended temperature range.

It is a further object of the invention to provide a seal for use in butterfly valves that are capable of meeting the requirements of the petroleum industry and withstanding the rigorous conditions which are experienced in such an area of use.

It is a still further object of the invention to provide a sealing mechanism which is operative, and effective throughout an extended range of pressure and temperature.

It is a still further object of the invention to provide a sealing mechanism which may be easily and economically manufactured through forming techniques not requiring expensive machining or fine interference fitting.

It is still a further object of the invention to provide a metal to metal sealing means which achieves a quality of sealing comparable to that of the most stringent metal seal standards.

It is still a further object to provide a metal seal ring which cooperates within a sealing mechanism to provide movable engagement which dynamically responds to the pressure of the system to impart greater sealing force to the metal to metal contact.

It is still a further object of the invention to provide a seal ring which is compressed within a groove, so that a high-strength, resilient side-sealing force is imparted to the engagement of the seal ring with the sides of the groove.

It is a further object of the invention to provide an embodiment in which the seal ring achieves sealing engagement based on a strong spring-like action resulting from compression of the seal ring in both the radial and axial dimensions.

The above and other objects of the present invention will become apparent from a reading of the following description taken in conjunction with the accompanying drawings, which illustrate preferred embodiments thereof.

DESCRIPTION OF THE PREFERRED EMBODIMENTS

The present invention can be employed in many kinds of systems which contain fluids at differing pressures, such as hydraulic or pneumatic systems where it is desirable to provide a seal in one or more portions thereof. In such a system, it may be desirable to provide components which can be opened or closed, i.e., positioned so that fluid flow is permitted or obstructed.

The present invention is intended to prevent leakage of fluid when such components are in a closed position, while, without diminishing the efficiency of the seal thus created, permitting such components to be opened with a minimum of force.

Figure 1:
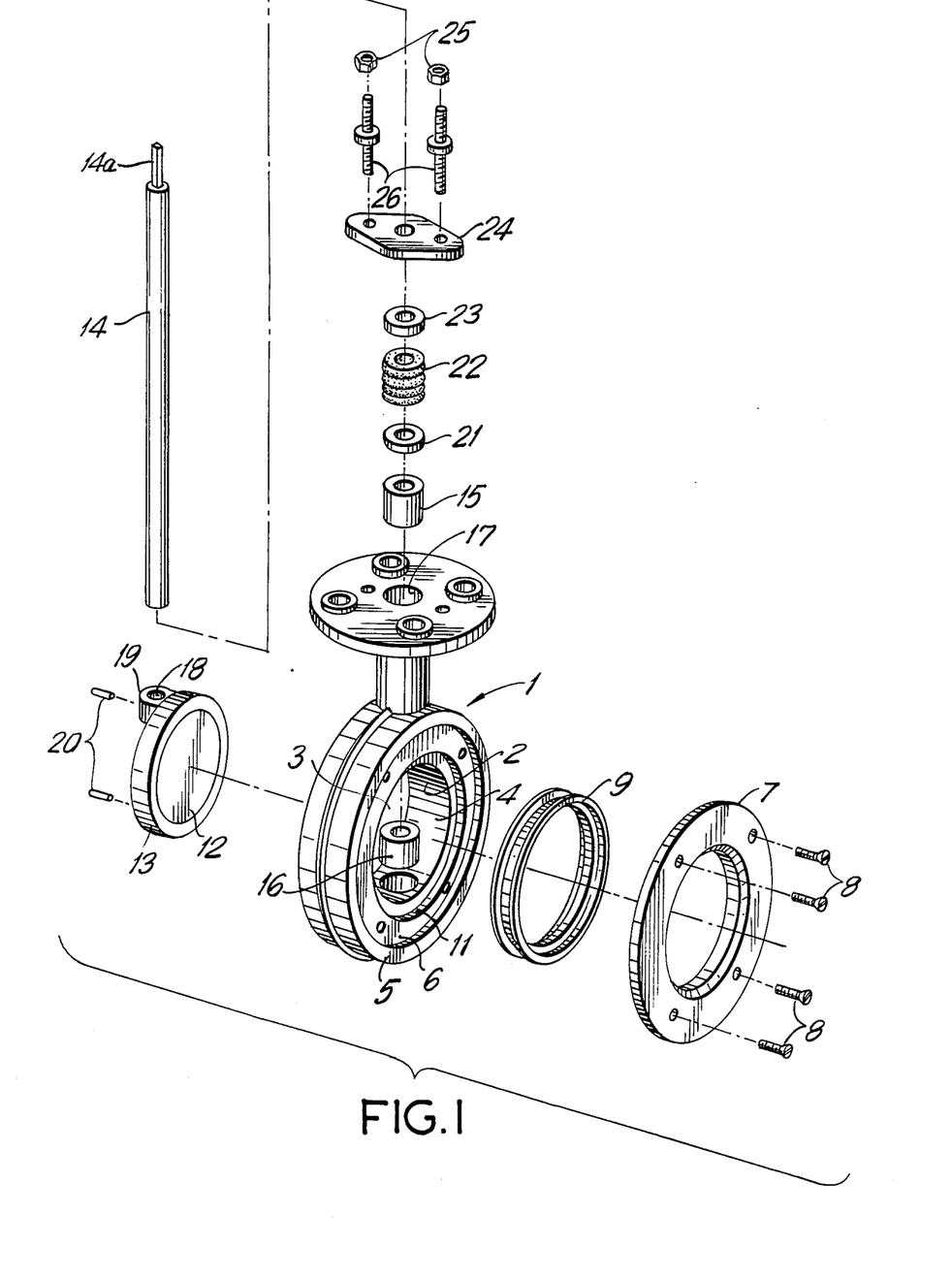
FIG. 1 is an exploded perspective view of a conventional trunion or butterfly valve in which the improved seal mechanism of the present invention may be incorporated.

To aid in understanding the arrangement and operating principle of the improved positive shut-off seal of the present invention, it will be described in an embodiment as incorporated in an otherwise conventional high performance butterfly valve or trunnion valve. FIG. 1 shows such a valve in exploded perspective.

The trunnion valve in FIG. 1 includes a valve body 1 in the form of a flat annular wafer having an internal passageway 2 with an inlet 3 and an outlet 4. The downstream or outlet face 5 of the valve body is counterbored with an annular recess 6 for flush mounting a retainer ring 7 by means of flat head machine screws 8. Retainer ring 7 serves to hold a sealing ring 9 within a circumferential groove 11 machined in the downstream edge of passageway 2.

A valve disk 12 having a circumferential sealing surface 13 is adapted to be mounted within passageway 2 for rotation about a diametrical axis between an open position in which the valve disk is substantially parallel to the axis of passageway 2 and a shut position in which the valve disk is substantially perpendicular to the passageway axis and sealing surface 13 makes mating contact with the seal ring 9.

Means for pivotally mounting the valve disk in the passageway for rotation between the open and shut positions includes a valve stem 14 mounted in upper and lower bushings 15 and 16 for rotation within a blind hole 17 bored diametrically through the valve body. Valve stem 14 passes through a hole 18 drilled through a diametrical boss 19 on the upstream face of the valve disk, which is locked to the stem by pins 20.

Leakage past the upper end of valve stem 14 is prevented by conventional stem packing means including spacer 21 and resilient packing rings 22, which are compressed in hole 17 against the top of bushing 15 by forcing gland 23 and follower 24 downward by means of nuts 25 screwed down on studs 26. Valve stem 14 is rotated in its bushings by a handle or motor drive (not shown) attached to the squared upper end 27 of the valve stem.

Figure 2:
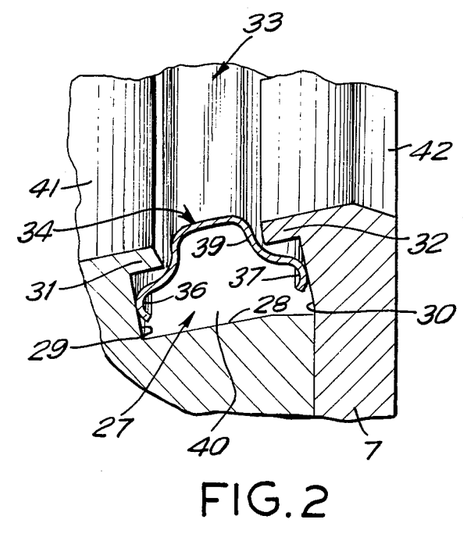
FIG. 2 is a partial cross-sectional view of a preferred embodiment of the seal ring in cooperation with the trunion valve of FIG. 1.

FIG. 2 shows a section of the assembled seating arrangement of the valve of FIG. 1, but showing in detail a preferred embodiment of the seal ring of the present invention. The combination, in general, of a seal ring within a groove is described in the previously mentioned Benware U.S. Pat. No. 3,642,248, the disclosure of which is hereby incorporated by reference in the present specification.

As in the Benware patent, the valve comprises a groove 27 having a base 28 and sidewalls 29, 30. The groove 27 in the preferred embodiment extends annularly since the closure member is a circular disk, in the valve described above. It is noted, however, that the present embodiment is not meant to limit the scope of the invention and the closure member may alternatively be, for example, a door mounted in a rectilinear frame.

The mouth of the groove 27 is defined by a pair of lip flanges 31, 32 extending from the sidewalls 29, 30 respectively. The groove, by means of said lip flanges fittingly hold the seal ring 33, the seating portion 34 of which projects through the mouth of said groove. The seating portion 34 of said seal ring is thus adapted to extend radially inward for sealing engagement with the complementary surface of the disk 35. The seating portion 34 of the seal ring 33 is convexly shaped with respect to the axis of the valve passageway.

The seal ring 33 is provided with shoulder portions 36, 37, which integrally extend on either side from said seating portion. The anterior surfaces of said shoulder portions 36, 37 are adapted to abut against the lip flanges 31, 32 such that said seal ring is held within said groove. The lateral surfaces of said shoulder portions are thus contained within said groove, abut the sidewalls 29, 30, and are slidably engageable therewith. The shoulder portions are resiliently biased against the sidewalls 29, 30, which serves to impart side-sealing contact to the engagement of the seal ring with the sides of the groove, as described hereafter.

The resilient bias of the seal ring 33 is achieved by the latter being of greater width than the circumferential groove 27 in which it is fitted. Consequently, said seal ring is compressed like a spring when held in said groove.

Variations in the dimensions of the seal ring are permitted to the extent that a satisfactory pre-loaded fit is obtained. However, the seal ring should be capable of returning to its uncompressed width so that the lateral side-sealing forces are maintained sufficiently high.

The surface of the seating portion 34 of the seal ring 33 is intended to engage disk 35 (FIG. 3), in order to seal against leakage. Said disk 35 includes a sealing surface 38 engageable with said seating surface of said seal ring. The disk 35 is representative of a great variety of components which are intended to be sealed in a pressurized system. For the embodiment illustrated in the drawing, disk 35 is a valve disk which is to be sealed against hydraulic or pneumatic leakage and is slidably engageable or otherwise abuttable against the seating portion 34 of seal ring 33. Said disk could also be a cover or hatch intended to be sealed against such leakage, it being understood that the specific reference herein to the nature of the disk 35 is only illustrative and is not intended as a limitation of the nature or application of this invention.

Figure 3:
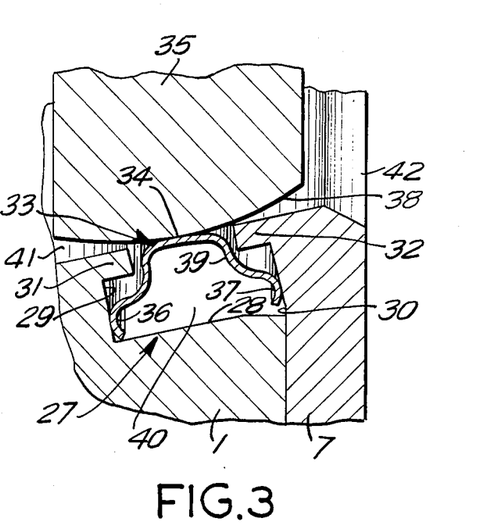
FIG. 3 is a partial cross-sectional view similar to FIG. 2, but with the disk in the closed position.
Figure 4:
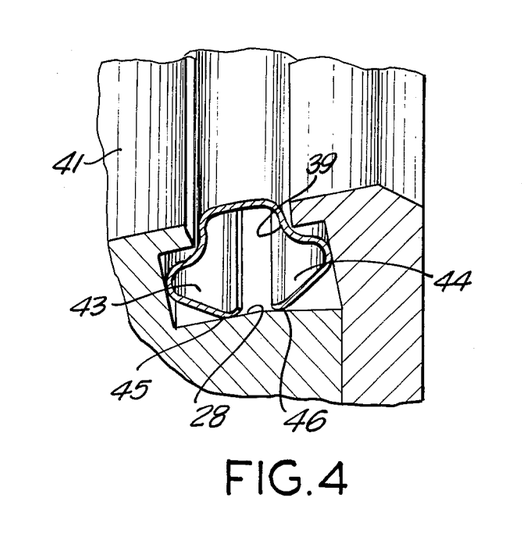
FIG. 4 is a partial cross-sectional view of a modified form of the invention wherein the lateral shoulders of the seal ring each have an extended appendage to further support side-sealing.

A second embodiment of the present invention is shown in FIG. 4. A seal ring similar to the one shown in FIGS. 2 and 3 is shown, except that legs 43, 44 integrally extend from each of the shoulder portions. Each leg extends generally in the posterior direction, with respect to the passageway of the valve, and together obliquely converge toward a radial axis of said seal ring. At the posterior ends of the legs, feet 45, 46 contact the base 28 of said groove.

Figure 5:
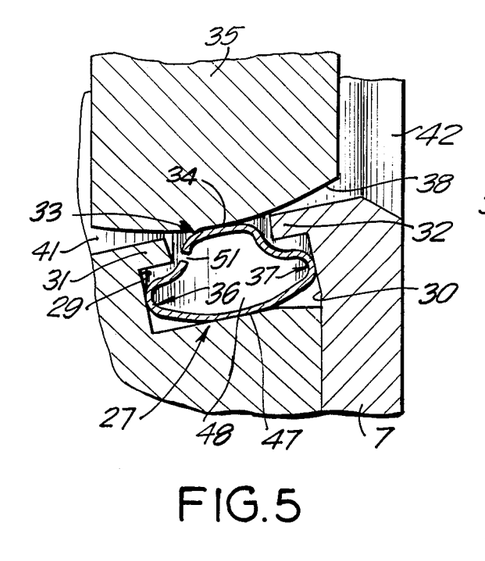
FIG. 5 is a partial cross-sectional view of another preferred embodiment of the present invention which comprises an O-ring formed seal.

Another embodiment of the present invention is shown in FIG. 5. As in the previous embodiments, the seal ring is confined in the circumferential groove 27 disposed in the body of the valve. In this particular embodiment, the seal ring is a hollow toroid constructed of metal and having the cross-sectional shape shown in FIG. 5. The seal ring is comprised of a front seating portion 34, shoulder portions 36, 37 and a back portion 47. The front seating portion abuts the sealing surface 38 of the disk 35 when the latter is in the closed position. The seating portion is integrally joined to the shoulder portions which are held within the circumferential groove by flange lips 31 and 32. The shoulder portions are integrally joined at each of the ends opposite the seating portion by the back portion, the seal ring thereby forming one continuous surface enclosing a toroidal cavity 48. The back portion 47 forms a convex surface with respect to the base of the circumferential groove and abuts the base of the circumferential groove when the seal ring is in sealing engagement with the disk. The summit of said convex surface contacts the base of the groove as is evident from FIG. 5.

Figure 6:
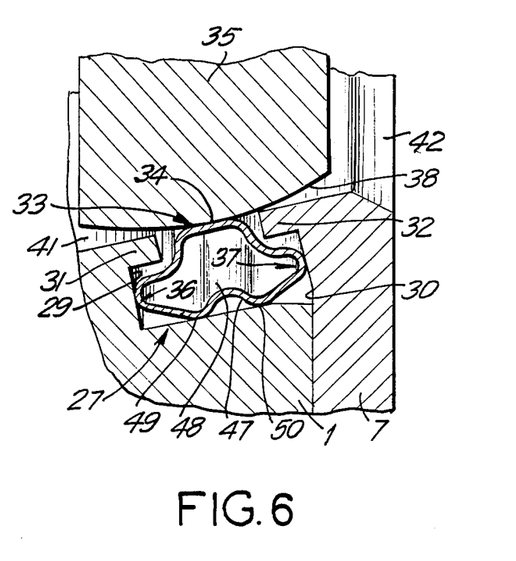
FIG. 6 is a partial cross-sectional view of a modified form of the embodiment of FIG. 5 wherein the back portion of the seal ring has dual contact with the base of the groove.

Referring to FIG. 6, the seal ring is modified from the embodiment shown in FIG. 5 by having dual protuberances 49 and 50, convex with respect to the base of the groove. These protuberances contact said base at two isolated circumferential locations when the seal ring is in mating engagement with the disk. The seal ring of FIG. 6 is otherwise identical to the seal ring of FIG. 5.

Figure 7:
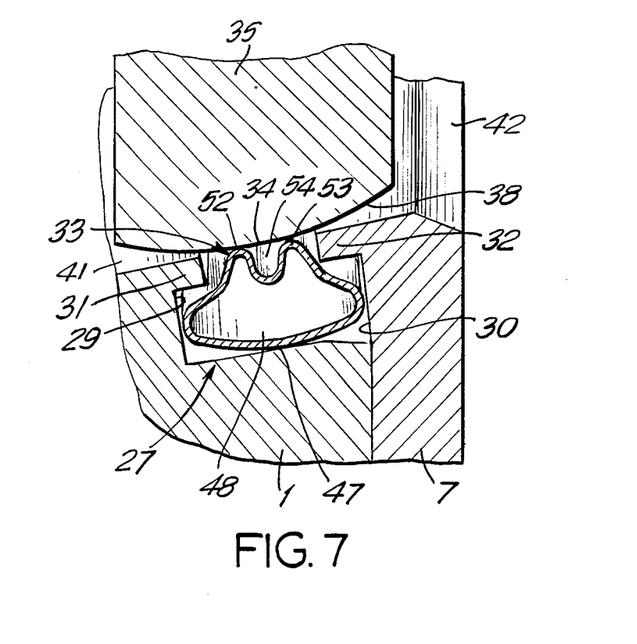
FIG. 7 is a partial cross-sectional view of a modified form of the embodiment of FIG. 5 wherein a groove is provided between the seal and the mating sealing surface.

FIG. 7 illustrates a further preferred embodiment of the instant invention wherein the seal ring 33 is provided with two protuberances 52 and 53 at the mating surface between the seal ring 33 and the mating sealing surface, disk 35, such that a groove 54 is provided therebetween. The purpose of the groove is to provide a recessed space in which an insert material (not shown) can be placed. The insert material can be metallic or non-metallic and should be selected based upon its wear and sealing properties. Possible candidates for filler materials include silver, copper, asbestos, graphite, plastics and elastomers. If necessary, the insert can be designed with tapered sides and the metal seal pinched or formed around the insert to lock it firmly in place. The insert enhances the seal between the seal and its mating sealing surface and offers improved cycle life. In the embodiment illustrated in FIG. 7, the back portion 47 of the seal ring is shown in contact with the base of the circumferential groove. This is not a requirement, however, and embodiments of the invention are contemplated where the back portion 47 of the seal need not necessarily be in contact with the base of the circumferential groove.

The seal rings shown in FIGS. 5, 6 and 7 may be obtained by reforming a hollow metal O-ring. Hence, the seal ring may be conveniently and inexpensively manufactured.

The hollow reformed O-rings are relatively thin walled for high resilience. The degree of stiffness or resiliency may be controlled by varying the thickness of the seal ring wall. Consequently, spring-like forces may be achieved when the seal ring of the present invention is compressed.

The strength and resilience of the seal rings shown in FIGS. 5, 6 and 7 may be enhanced by pressurization of the interior or toroidal cavity of the seal ring. The seal ring may be pressurized by injecting a gas into the cavity of the O-ring during fabrication. Alternatively, the interior of the seal ring may be pressurized by providing optional apertures 51 (FIG. 5) in the upstream wall of the seal ring. System fluid pressure is thereby permitted to enter the interior of the seal ring. Likewise, purge holes may be placed in various other locations along the seal, e.g. in the back of the seal or in either side of the seal, in any of the embodiments of FIGS. 5, 6 and 7, so that the same would result in improved performance of the seal.

The continuous cross-section of the seal ring has the advantage of providing stability to the sealing mechanism, particularly at elevated temperatures. Due to the continuous configuration of the seal ring, the bearing force remains unaffected by high temperatures, whereas other seal rings may tend to loose their sealing force on account of thermal expansion.

All of the seal ring embodiments of the present invention are preferably composed of a high temperature resistant, high corrosion resistant metal alloy exhibiting high yield strength and a satisfactory modulus of elasticity. High alloy materials such as Inconels or Hastalloys may be used. Stainless steel or bronze may also be employed.

The seal rings of the various embodiments of the present invention are formed with a seating portion which is convex with respect to the sealing surface of the closure member. Viewed in cross-section in FIG. 2, the convex seating portion is integrally joined on both sides through an inflection point 39 to a pair of lateral shoulder portions 36, 37 which are convex with respect to the sidewalls of the groove. By the term inflection is meant a change of curvature, with respect to a fixed line intersecting the juncture of the seating portion and shoulder portion, said curvature serving to continuously join the convex surfaces of said seating portion and said shoulder portion.

The cross-sectional shapes of the present embodiments are of particular interest. However, various other shapes which are equivalent or which utilize the basic design will be apparent to one of ordinary skill in the art.

As an optional modification, bubble-tight sealing may be obtained by applying a suitable coating to the seating portion of the metal seal ring or to the complementary sealing surface of the closure member. For example, a thin layer of Teflon may be adhesively coated on the seating portion of the seal ring. Alternatively the seating surface may be coated or plated with such materials as gold, silver, copper, nickel, graphite, or other coatings that would enhance performance.

Figure 8A:
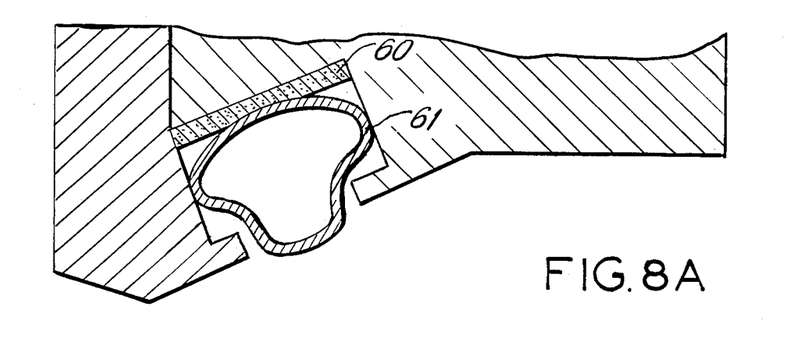
FIGS. 8A–8D are partial cross-sectional views of another preferred embodiment of the invention wherein gaskets are provided between the seal and the groove.
Figure 8B:
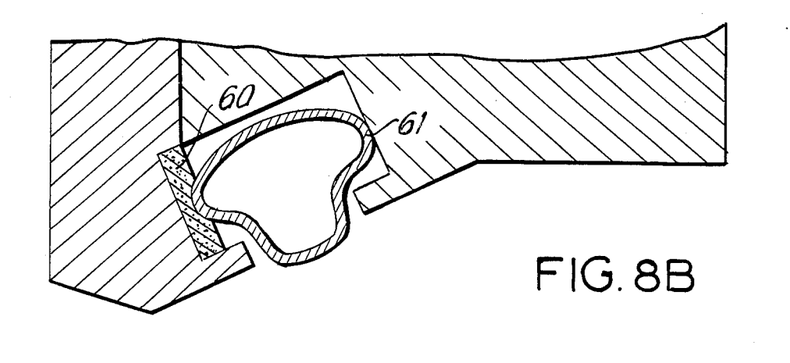
Figure 8C:
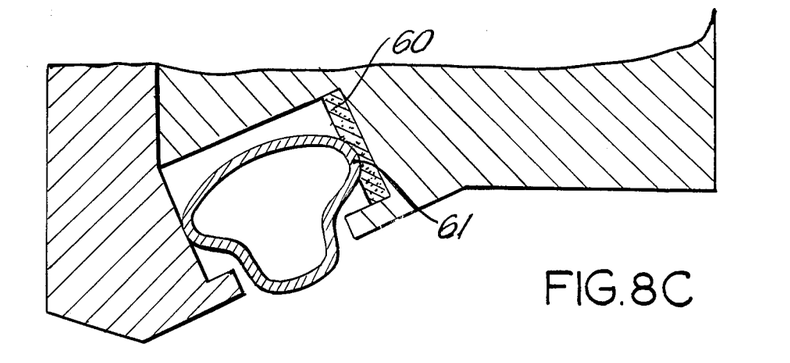
Figure 8D:
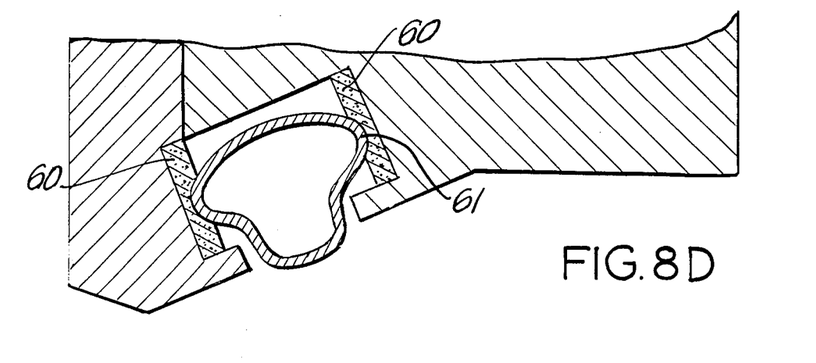

As a further optional modification, a gasket or gaskets may be inserted into the seal groove, between the seal ring and surface of the groove, to improve the performance of the seal by insuring more consistent leakage results. The use of such seals is illustrated in the drawings of FIGS. 8A through 8D, which, respectively, show gaskets 60 between the back portion of the seal and the base of the groove (FIG. 8A); between alternate shoulder portions of the seal and their respective sides of the groove (FIGS. 8B and 8C); and simultaneously between both shoulder portions and their respective sides of the groove (FIG. 8D). Such a gasket may comprise materials such as graphite, asbestos, rubber or other materials. Non-asbestos gasket materials are particularly comprehended for future use.

Although the cross-sectional shapes of the seal rings 61 illustrated in FIGS. 8A through 8D are similar to the shape of the seal disclosed in FIG. 5, a gasket or gaskets may be similarly utilized with the seals of the embodiments disclosed in FIGS. 6 and 7 and with other seals according to the invention. Gaskets used with these embodiments are intended to insure more consistent leakage results. Note that when a gasket is used with a seal having the cross-sectional shape of the seal disclosed in FIG. 5, e.g. FIGS. 8A-8D, the back of the seal need not necessarily abut the base of the groove.

Figure 10:
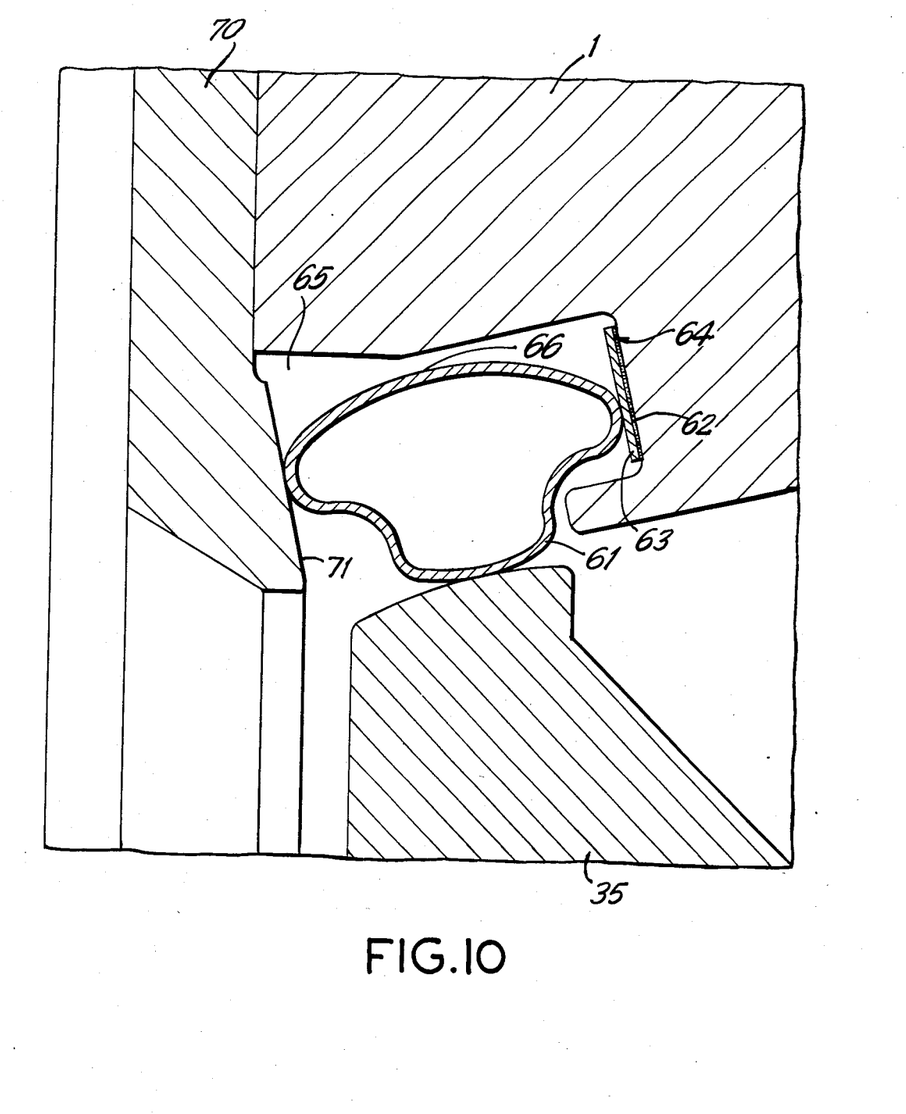
FIG. 10 is a partial cross-sectional view of a further preferred embodiment of the invention wherein the lip has been removed from the retaining ring.

FIG. 10 illustrates a further preferred embodiment of the invention wherein the retaining ring 71 is substantially flat along the seal ring contact surface 71. This embodiment (FIG. 10) may thus be contrasted, for example, with the embodiment illustrated in FIG. 5 in which the retaining ring 7 has a lip portion 32 partially surrounding the seal ring 7. Deletion of the lip portion from the retaining ring may allow a smoother or otherwise more preferred finish to be applied to the seal ring contact surface 71. Deletion of the lip portion may also avoid occasional interference which may occur between the lip portion and the sealing disk 35. The retaining ring 70 of FIG. 10 may of course, either be machined to remove a prefabricated lip portion such as 32 (FIG. 5) or may be fabricated initially without such a lip portion.

The embodiment of FIG. 10 further illustrates a gasket 64 provided between the valve body 1 and the seal ring 61 on the body side 65 of the modified "T" slot formed between the retaining ring and the valve body 1. In preferred embodiments, the gasket 64 may be a metal/graphite lamination, with the metal portion 63 contacting the seal 61 and the graphite portion 62 contacting the body 1. Note that in the embodiment of FIG. 10, the back 66 of the seal ring 61 does not contact the body 1; the sealing around the back portion of the seal is accomplished by the gasket 64. Note further that, if desired, the seal ring 61 of the embodiment of FIG. 10 may be provided with ventilation holes.

Figure 9:
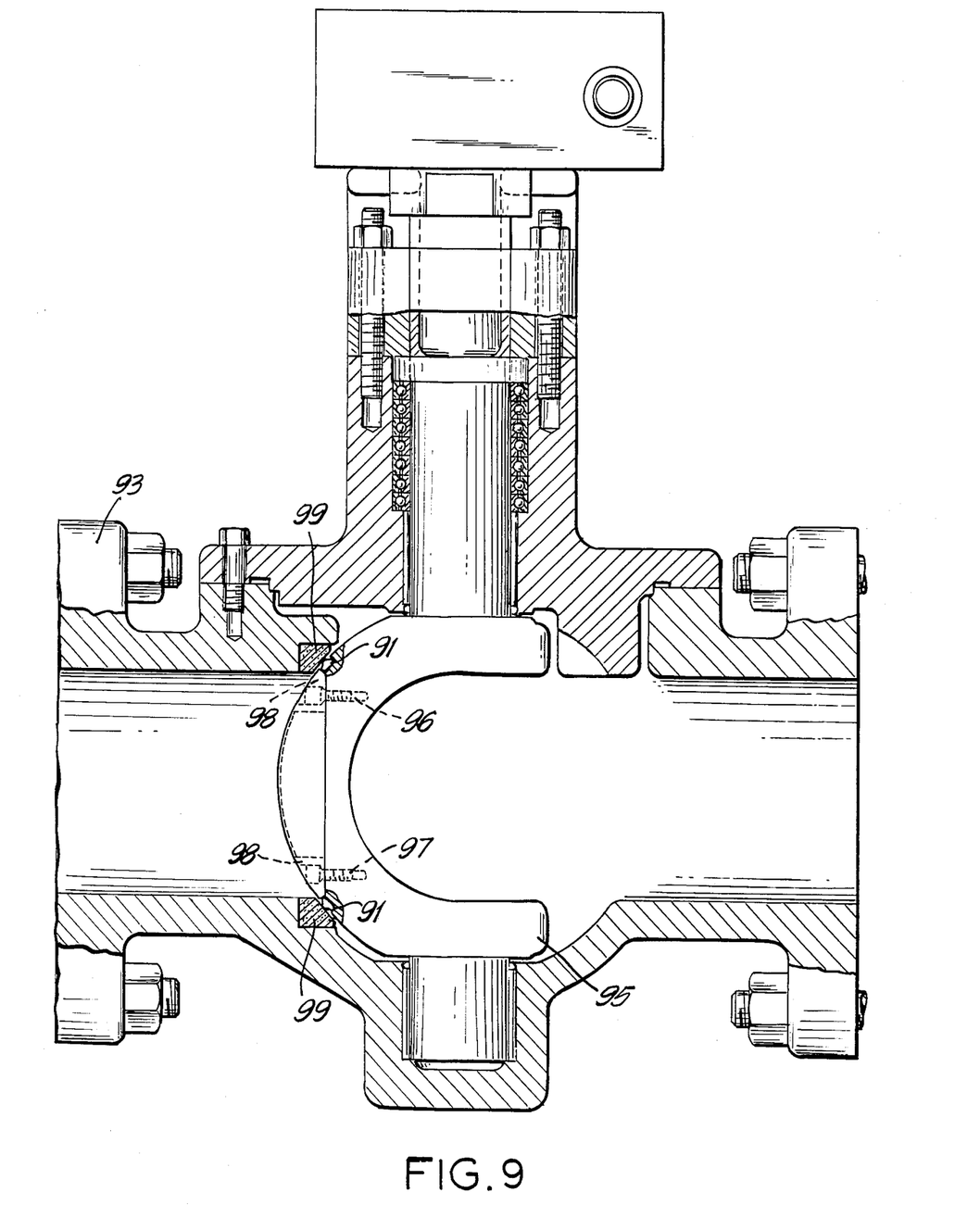
FIG. 9 is a partial cross-sectional view of a further embodiment of the invention wherein the seal is located on the closure member of a valve.

Alternate embodiments of the invention further include those embodiments where the seal is placed on the valve closure member as opposed to its being placed in the valve body. Such an embodiment is disclosed in FIG. 9 which illustrates a ball valve, with a sealing mechanism according to the instant invention, wherein the seal 91 is placed in the ball segment 95. To effect closure, the ball segment 95 is rotated until the seal 91 mounted thereon is compressed against the ball valve body 93. The ball valve utilized may be a six inch 600 ANSI segmented ball valve. In the embodiment of FIG. 9, the seal may be secured within the groove by a ring 98 and fastening means 96, 97 such as metal screws. The chamfer around the periphery of the ring may be machined smooth. Further the valve body may be modified at the sealing surface to contain a removable metal ring 99 with an erosion, corrosion and wear resistant surface coating. Such a ring may be held in place by an interference fit, wherein the diameter of the outer retaining body is greater than the diameter of the ring 99.

Operation of the Preferred Embodiments

In the embodiments of FIGS. 2 and 3, seal ring 33, in cooperation with the groove 27, is adapted to communicate high fluid pressure from the region upstream of disk 35 to the interior of the groove 40. This fluid pressure is employed to aid in urging the seal ring 33 and hence seating surface 34 against disk 35 to maintain seal efficiency and avoid leakage therebetween.

The operation of the seal ring in response to pressure is as follows. Referring to FIG. 3, when there is a sufficient pressure differential between regions 41 and 42, pressure will be introduced into the interior region 40 of the groove. Because the shape of the seal ring 33 is adapted for flexibility, the fluid pressure is permitted to enter the interior region even though the shoulder portions 36, 37 normally abut the sidewalls of the groove. The system pressure in the interior region 40 will act upon the exposed back surface of the seal ring so as to urge it toward the complementary surface of the circumferential edge of the disk.

Said system pressure thus creates a thrust beneath said seal ring 33 which achieves enhanced sealing contact with the disk. The pressure exerted by the seal ring against the disk is referred to as the bearing pressure. This bearing pressure is concentrated along the summit of the convexly shaped seating portion of the seal ring. The sealing contact, between the sealing surface of the disk and the seating portion of the seal ring, is maintained along a circumferential, relatively narrow surface. This is particularly the case when, as shown in FIGS. 3 and 4, the sealing surface of the disk is convexly shaped with respect to the seal ring, hence resulting in the meeting of opposing convex surfaces.

As an example of the above described operation, if the pressure in passageway region 41 is sufficiently greater than in passageway region 42, said pressure will urge the shoulder portion 36 of the seal ring 33 away from the flange lip 31 and sidewall 29 of the groove 27. Thereby, a channel is temporarily formed in order to permit the transmission of the higher pressure of said region 41 into the interior region 40 of the groove.

Once introduced into the groove, said pressure will urge the other shoulder 37 of seal ring 33 against the sidewall 30 and lip flange 32, thereby sealing said pressure against escape from region 40 into passageway region 42, which as mentioned above is at a lower pressure than passageway region 41.

The disk when closed exerts a generally radial force against the seating portion of the seal ring. This radial force is resisted by the bearing pressure transmitted through the seal ring, as explained above. The disk in the closed position, pushing against the seating portion of the seal ring, would expand the distance between the shoulder portions were the latter not constrained by the sidewalls of the 9roove. This counteraction between the lateral and radial forces serves to further increase the side preload of the seal ring against the sidewalls of the groove.

In the embodiment of FIG. 4, the legs 43, 44 of the seal ring include feet 45, 46 which contact the base of the groove. This contact further contributes to the sealing by providing a secondary seal.

The operation of the seal rings of FIGS. 5 and 6 is not completely analogous to the previous embodiments. Although the seal ring is similarly partially confined within the circumferential groove in the valve body, there is comparatively less space for radial adjustment of the seal ring within the groove. Thus, the back portion of the seal ring must abut the base of the circumferential groove when the disk is moved to the closed position. The closure of the disk causes a radial force to bear against the seating portion of the seal ring. This force would tend to expand the axial diameter of the seal ring if it were not limited by the side walls of the circumferential groove. In counteraction to the force exerted by the disk, the back portion of the seal ring presses against the base and the shoulder portions press against the side walls of the circumferential groove so that the seal ring is radially compressed or flattened to some extent within the groove. Consequently, tight sealing contact is achieved between the mating surfaces of the sealing mechanism.

This sealing contact is capable of withstanding and responding to system pressures which would otherwise separate the mating surfaces and break the seal. The sealing mechanism responds to the pressure within the system to strengthen the sealing forces in direct proportion to said pressure so that said sealing forces are at all times greater or equal to the resultant forces which urge the mating surfaces apart.

The embodiment of FIG. 7 is similar in operation to the embodiments of FIGS. 5 and 6, however, with the embodiment of FIG. 7, the filler material placed within groove 54 further enhances the seal between the seal ring and its mating sealing surface. A further difference in the operation of the embodiment of FIG. 7 is that the back portion of the seal ring of this embodiment need not necessarily contact the base of the circumferential groove during operation.

The use of a gasket in embodiments of the instant invention, as disclosed in FIGS. 8A through 8D and in FIG. 10, may in operation serve to improve (or insure more consistent) leakage results. The presence of the gasket serves not only to lessen leakage at the point of contact where the seal meets the gasket and where the gasket meets the groove, there providing a typical gasket function, but it also results in a tighter seal at the remaining contact points of the sealing mechanism. For example, as in FIG. 8A, where the gasket 60 is placed between the back of the seal and the base of the groove, the consequent lessening of area available for expansion of the seal when pressure is applied thereto will result in increased contact pressure at the points where the seal shoulders contact the sides of the groove. Likewise, in FIGS. 8B and 8C, the lateral force applied through the seal shoulders will be increased when closure force is applied to the seal, because the presence of the gasket results in a lessening in the available area for expansion of the seal. Note that when a gasket is utilized with a seal similar in cross-sectional configuration to the seal disclosed in FIG. 5, the back of the seal need not abut the base of the groove as it does with the embodiment of FIG. 5.

Although the operation of the valve was described for illustrative purposes in a system having a greater pressure in the upstream passageway, it will be readily understood that the sealing mechanism of the present invention will accomplish sealing action, in an analogous manner, if the higher pressure originates from the other direction.

The embodiment of FIG. 9, in which the seal is placed on the ball segment of a segmented ball valve, operates in a manner which is slightly different from the previously described embodiments. In the operation of this embodiment, when the ball segment, with the seal mounted thereon, is rotated such that the seal comes in contact with the sealing surface of the valve body, the seal will be compression between the seal groove and the sealing surface whereby substantially leak proof closure will be achieved. The fluid pressure against the seal further increases the pressure at the contact points as described above.

COMPARATIVE TESTING

As is evident from a consideration of the prior art, the quality of sealing which may be obtained from a given design of a seal ring is not predictable. The superiority of the present invention in regard to leak proof sealing is quite surprising, especially in view of its relatively simple design and manufacture. The superior performance, simplicity of design, and fire-proof nature of the seal ring of the present invention are factors which are extremely important in the valve art. The following example shows the unexpectedly superior performance of an embodiment of the present invention in comparison to the seal ring according to FIGS. 14–17 of the Benware U.S. Pat. No. 3,642,248.

A trunion type valve according to FIGS. 14–17 of Benware U.S. Pat. No. 3,642,248, having a ten-inch nominal inside diameter and rated for 290 PSI pressure, exhibits a consistant leak rate of 54.4 standard cubic feet per hour (Posi-Seal Technical Bulletin No. 7, Table 1, June 82).

A trunion valve according to the present preferred embodiment shown in FIG. 2 and of the same size and pressure exhibits a typical leakage rate of 1.45 SCFH (average of three tests). The valves having the seal ring of the present invention are shown to have superior sealing effectiveness. These valves evidenced a leakage rate of no more than 0.145 standard cubic feet per hour per inch of valve diameter. In comparison, the prior art valve showed leakage rates exceeding 5.4 standard cubic feet per hour per inch of valve diameter.

SUMMARY

The seal ring of the present invention achieves an extraordinary degree of sealing effectiveness in view of its simple and economical design. The all metal nature of the seal ring renders unnecessary the Teflon inserts utilized in the prior art. Hence, destruction of the seal by fire, or the necessity for a back-up or secondary seal is obviated. The ability of the seal ring to function under high temperature conditions responds to the need for a fire safe sealing mechanism for a butterfly valve usable in such industrial fields of applications as petroleum processing.

Another advantage of the present invention is that the metal seal ring may be inexpensively and conveniently manufactured by forming rather than machining. This permits the use of high alloy metals having high strength and resilience. Hence, the construction of the seal ring of the present invention assures reliability and durability.

While the invention has been described in conjunction with the foregoing illustrative specific embodiments, numerous modifications will be apparent to one skilled in the art in light of the foregoing description. Accordingly, it is not desired to limit the invention to the exact and detailed construction shown, but rather it is intended to embrace all variations which fall within the spirit and broad scope of the invention as claimed.

We claim:

1. A sealing mechanism capable of use in a valve subject to extend temperatures and pressures, comprising a metal seal ring adapted to fit within an undercut groove, circumferential to the passageway of said valve, said groove having means defining an opening between opposed sides, said sides spaced apart by a distance greater than the width of said opening;

said metal seal ring comprising a convex seating portion adapted to extend through said opening for engagement with a complementary sealing surface of a closure member, said convex seating portion integrally joined at the sides thereof to one end of each of a pair of lateral shoulder portions, said shoulder portions adapted for contact with the sides of said groove, and wherein said metal ring is resiliently compressed in width while being held in said groove, so that a side-sealing force is imparted to said contact with the sides of said groove, and wherein a bearing force is exerted between said seating portion of said seal ring and said sealing surface of said closure member when the latter is in the closed position so that essentially no leakage occurs;

wherein the other end of each of said pair of shoulder portions is integrally joined to a back portion, wherein said metal seal ring defines a toroidal cavity, and whereby when the closure member is in the closed position, said back portion is pressed against the base of said circumferential groove, such that said seal ring is compressed in the radial direction and in a spring-like manner exerts a force in counteraction to the radial force exerted by said closure member against said seating portion of said seal ring; and wherein when said closure member is in the closed position, said seal ring is radially compressed in proportion to said bearing forces whereby said side-sealing force is correspondingly increased.

2. A sealing mechanism according to claim 1 wherein the seal ring is energized.

3. A sealing mechanism according to claim 1, wherein said seal ring is comprised of a metal alloy.

4. A sealing mechanism according to claim 1, wherein said seal ring comprises stainless steel, Inconel, Hastelloy, titanium or bronze.

5. The sealing mechanism of claim 1, wherein the sealing surface of said closure member is convex with respect to said seating portion of said seal ring.

6. A sealing mechanism according to claim 1, wherein the seating portion of said metal seal ring has a coating of a material softer than that of the seal ring in order to provide enhanced sealing.

7. A sealing mechanism according to claim 6, wherein said softer material comprises gold, silver, copper, nickel, graphite or Teflon.

8. A sealing mechanism according to claim 1, wherein said seal ring is internally pressurized.

9. A sealing mechanism according to claim 8 wherein said seal ring contains fluid.

10. A sealing mechanism according to claim 8, wherein said seal ring contains above ambient gas pressure permanently sealed therein, said gas pressure having been injected into the cavity of said seal ring during fabrication thereof.

11. A sealing mechanism according to claim 1, wherein the wall of said seal ring exposed to the upstream fluid pressure defines a plurality of apertures which permit upstream fluid pressure to enter said seal ring.

12. A sealing mechanism for use in an extended temperature range valve, comprising a metal seal ring adapted to fit within a circumferential groove in the body of said valve for sealing engagement with a complementary sealing surface of a disk, said metal seal ring having a convex seating portion for contact with said complementary sealing surface, said convex seating portion integrally joined on both sides through a circumferential inflection to a pair of shoulder portions, each of said shoulder portions adapted for contact with each side of said groove, the other end of each of said pair of shoulder portions integrally joined to a back portion, wherein said metal seal ring defines a toroidal cavity and wherein said metal seal ring is resiliently compressed in width while held in said groove, and wherein when said disk is in the closed position, said back portion is pressed against the base of said circumferential groove, such that said seal ring is compressed in the radial direction and in a spring-like manner exerts a force in counteraction to the radial force exerted by said disk against said seating portion of said seal ring so that sealing engagement of the seal ring is achieved.

13. A sealing mechanism, comprising a metal seal ring adapted to fit within an undercut groove, circumferential to the passageway of a valve, said groove having means defining an opening between opposed sides, said sides spaced apart by a distance greater than the width of said opening;

said metal seal ring comprising a convex seating portion adapted to extend through said opening for engagement with a complementary sealing surface of a closure member, said convex seating portion integrally joined at the sides thereof to one end of each of a pair of lateral shoulder portions, said shoulder portions adapted for contact with the sides of said groove, and wherein said metal ring is resiliently compressed in width while being held in said groove, so that a side-sealing force is imparted to said contact with the sides of said groove, and wherein a bearing force is exerted between said seating portion of said seal ring and said sealing surface of said closure member when the latter is in the closed position so that essentially no leakage occurs;

wherein the other end of at least one of said pair of shoulder portions is integrally joined to a back portion, wherein said metal seal ring defines a toroidal cavity, wherein said convex seating portion comprises a plurality of protuberances convex with respect to the base of said groove, and whereby when the closure member is in the closed position, said seal ring is compressed in the radial direction and in a spring-like manner exerts a force in counteraction to the radial force exerted by said closure member against said seating portion of said seal ring.

14. A sealing mechanism according to claim 13 wherein said back portion is pressed against the base of said circumferential groove when the closure member is in the closed position.

15. A sealing mechanism according to claim 13, wherein said convex seating portion of said seal ring comprises at least two circumferential protuberances which traverse the inner length of said seal ring such that a groove is provided between said protuberances.

16. A sealing mechanism according to claim 15 wherein a filler material is secured within said groove between said protuberances.

17. A sealing mechanism according to claim 15 wherein a filler material is rigidly secured within said groove between said protuberances.

18. A sealing mechanism according to claim 16 wherein said filler material comprises silver, copper, asbestos, graphite, plastics or elastomers.

19. A sealing mechanism according to claim 13, wherein a purge hole is placed through said seal.

20. A sealing mechanism according to claim 13, wherein a gasket is placed between said seal and said circumferential groove.

21. A sealing mechanism, comprising a metal seal ring adapted to fit within an undercut groove, circumferential to the passageway of a valve, said groove having means defining an opening between opposed sides, said sides spaced apart by a distance greater than the width of said opening;

said metal seal ring comprising a convex seating portion adapted to extend through said opening for engagement with a complementary sealing surface of a closure member, said convex seating portion integrally joined at the sides thereof to one end of each of a pair of lateral shoulder portions, at least one of said shoulder portions being adapted for contact with the sides of said groove, and wherein said metal ring is resiliently compressed in width while being held in said groove, so that a side-sealing force is imparted to said contact with the sides of said groove, and wherein a bearing force is exerted between said seating portion of said seal ring and said sealing surface of said closure member when the latter is in the closed position so that essentially no leakage occurs;

wherein the other end of each of said pair of shoulder portions is integrally joined to a back portion, wherein said metal seal ring defines a toroidal cavity, wherein a gasket is placed between said seal and said circumferential groove, and whereby when the closure member is in the closed position, said seal ring is compressed in the radial direction and in a spring-like manner exerts a force in counteraction to the radial force exerted by said closure member against said seating portion of said seal ring.

22. A sealing mechanism for use in an extended temperature range valve, comprising a metal seal ring adapted to fit within a groove in the closure member of said valve for sealing engagement with a complementary sealing surface, said metal seal ring having a convex seating portion for contact with said complementary sealing surface, said convex seating portion integrally joined on both sides through a circumferential inflection to a pair of shoulder portions, each of said shoulder portions adapted for contact with each side of said groove, the other end of each of said pair of shoulder portions integrally joined to a back portion, wherein said metal seal ring defines a toroidal cavity and wherein said metal seal ring is resiliently compressed in width while held in said groove, and wherein when said closure member is in the closed position, said seal ring is compressed in the radial direction and in a spring-like manner exerts a force in counteraction to the radial force exerted by said complementary sealing surface against said seating portion of said seal ring so that sealing engagement of the seal ring is achieved.

23. A sealing mechanism according to claim 22 wherein said valve is a ball valve and wherein said closure member is the ball segment of said ball valve.

24. A sealing mechanism for use in an extended temperature range valve, comprising a metal seal ring adapted to fit within a circumferential groove in the body of said valve for sealing engagement with a complementary sealing surface of a disk, said metal seal ring having a convex seating portion for contact with said complementary sealing surface, said convex seating portion integrally joined on both sides through a circumferential inflection to a pair of shoulder portions, the other end of each of said pair of shoulder portions integrally joined to a back portion, wherein said metal seal ring defines a toroidal cavity and wherein said metal seal ring is resiliently compressed in width while held in said groove, and wherein when said disk is in the closed position, said seal ring is compressed in the radial direction and in a spring-like manner exerts a force in counteraction to the radial force exerted by said disk against said seating portion of said seal ring so that sealing engagement of the seal ring is achieved.

25. A sealing mechanism for use in an extended temperature range valve, as recited in claim 24, further comprising gasket means disposed in said circumferential groove between seal and said valve body.

26. A sealing mechanism for use in an extended temperature range valve, as recited in claim 24, wherein said circumferential groove is partially defined by only one circumferential lip portion and wherein the side of the groove opposite side which abuts said lip is substantially flat.

27. A sealing mechanism for use in an extended temperature range valve, as recited in claim 26, further comprising gasket means disposed in said circumferential groove between said seal and said valve body.

* * * * *